United States Patent [19]

Maruyama et al.

[11] Patent Number: 4,925,321
[45] Date of Patent: May 15, 1990

[54] DYNAMIC PRESSURE AIR BEARING UNIT

[75] Inventors: Teruo Maruyama, Hirakata; Akira Takara, Kadoma, both of Japan

[73] Assignee: Matsushita Electric Industrial Co., Ltd., Osaka, Japan

[21] Appl. No.: 374,207

[22] Filed: Jun. 29, 1989

[30] Foreign Application Priority Data

Jun. 29, 1988 [JP] Japan ................... 63-161616

[51] Int. Cl.⁵ ............................................. F16C 32/06
[52] U.S. Cl. ................................... 384/114; 384/100
[58] Field of Search ............... 384/100, 107, 114, 115, 384/118–120, 291, 292

[56] References Cited

U.S. PATENT DOCUMENTS

| 4,652,149 | 3/1987 | Nakaoka et al. | 384/107 X |
| 4,696,584 | 9/1987 | Tielemans | 384/114 X |
| 4,772,136 | 9/1988 | Carter | 384/112 |
| 4,820,950 | 4/1989 | Hijiya et al. | 384/115 |

Primary Examiner—Thomas R. Hannon
Attorney, Agent, or Firm—Panitch Schwarze Jacobs & Nadel

[57] ABSTRACT

A dynamic pressure air bearing unit comprising a rotating shaft and a bearing member fitted around the rotating shaft, wherein a first spiral groove is disposed on a part of one of two cylindrical bearing surfaces facing each other, one being of the rotating shaft and the other of the bearing member, the first spiral groove acting to impel lubrication air between the cylindrical bearing surfaces toward the innermost portion of the bearing member with the rotation of the rotating shaft, and a second spiral groove is disposed on a portion of the cylindrical bearing surface adjacent to the open end of the bearing member, the second spiral groove acting to discharge air toward the open end of the bearing member, an air conducting passage being provided to connect the boundary portion between the first and second grooves with the outside of the bearing unit, and the air passage having a filter installed at the open end thereof, thereby providing a dynamic pressure air bearing unit capable of operating in an environment subjected to floating dust.

14 Claims, 4 Drawing Sheets

DISTANCE FROM THE POSITION OF
THE ANNULAR GROOVE 7 TO
THE INNER BOTTOM 2a

DYNAMIC PRESSURE AIR BEARING UNIT

BACKGROUND OF THE INVENTION

1. Field of the invention

The present invention relates to a dynamic pressure air bearing unit.

2. Description of the prior art

In recent years, dynamic pressure air bearings having spiral grooves have come to be used as a bearing unit for supporting a high-speed rotating body which rotates in the order of tens of thousands of r.p.m.

Methods are known, for example, for the production of a dynamic pressure air bearing unit having the construction as shown in FIG. 6, in which one end portion of a rotating shaft 41 is fitted into a cylindrically shaped bearing member 42 having a closed end, incorporating a spiral groove design with a plurality of threads 43 being formed on either the outer circumferential surface on the one end portion of the rotating shaft 41 or the inner circumferential surface of the bearing member 42, the spiral groove 43 acting as a pump with the rotation of the rotating shaft 41 to impel lubrication air 44 between the rotating shaft 41 and the bearing member 42 toward an inside bottom 42a of the bearing member 42, increasing the air pressure and thus generating a supporting force in the radial direction with the lubrication air 44 acting as a wedge thrusting between the inner circumferential surface of the bearing member 42 and the outer circumferential surface of the rotating shaft 41, while supporting the thrust load by the thrust of the pressure acting on an endmost portion 41a of the rotating shaft 41.

A dynamic pressure air bearing unit of such construction has the advantages of a longer life, lower vibration and little noise as compared with ball bearings, and, making use of such advantages, has come to be used for office peripherals and other equipment, the application including a bearing unit for a polygon mirror for laser printers.

On the other hand, for a conventional fan motor used for example in an electric vacuum cleaner, a DC motor capable of high-speed rotation at 20,000 to 30,000 r.p.m. is used, while the rotor to which a fan is secured is supported by two sets of ball bearings.

In recent years, providing a smaller size, lower noise vacuum cleaner has become a major subject of development, and as the most effective means for reducing the size of a vacuum cleaner, designing a higher speed motor is being studied. As is well known, the output W of a motor is given by:

$$W \propto L \cdot D^2 \cdot N$$

wherein L is the length of the motor, D the outer diameter, and N the rotating speed. In this case, for example, if N is doubled, the same motor output can be obtained by shortening the length to half or by reducing the outer diameter to 1/1.4.

However, faster motor speed involves various problems such as:

(1) Increased wear and noise of motor brushes.
(2) Shorter life and increased noise of ball bearings.

Since there is a good possibility of solving the problem (1) because of the recent improvement of performance and reduction of costs of brushless motors, the problem (2) has now become the major point yet to be solved.

Accordingly, a dynamic pressure air bearing unit having the aforementioned features may be considered as a replacement for the ball bearings, but the use of the air bearing in a dusty environment like a vacuum cleaner will involve the problem that the infiltration of dust would immediately cause seizure with a resultant damage to the bearing since the bearing clearance $\delta$ is set at a few $\mu$m. Specifically, in the case of the dynamic pressure air bearing as shown in FIG. 6, the dust floating in the vicinity of the bearing opening is drawn into the bearing by the pumping action of the spiral grooves 43, the foreign matter thus caught inside the bearing causing damage and seizure of the bearing.

SUMMARY OF THE INVENTION

The dynamic pressure air bearing unit of this invention, which overcomes the above-discussed and numerous other disadvantages and deficiencies of the prior art, comprises a rotating shaft and a bearing member fitted around the outer circumferential surface of said rotating shaft, wherein a first spiral groove is disposed on a part of one of two cylindrical bearing surfaces facing each other, one being of said rotating shaft and the other of said bearing member, said first spiral groove acting to impel lubrication air between the cylindrical bearing surfaces toward the innermost portion of said bearing member with the rotation of said rotating shaft, and a second spiral groove is disposed on a portion of said cylindrical bearing surface adjacent to the open end of said bearing member, said second spiral groove acting to discharge, air toward said open end of said bearing member, an air conducting passage being provided to connect the boundary portion between said first and second grooves with the outside of said bearing unit, and the air passage having a filter installed at the open end thereof.

In a preferred embodiment, the bearing member has a closed end.

In a preferred embodiment, the end of said rotating shaft fitted into said bearing member is formed in a spherical shape so as to point-contact the inside bottom of said bearing member.

In a preferred embodiment, the air passage is formed inside of said rotating shaft.

In a preferred embodiment, a recessed portion is formed on the circumferential surface of said rotating shaft, said recessed portion having an air filter installed therein.

In a preferred embodiment, an annular groove for supplying air is formed on the portion of said rotating shaft where the boundary portion between said first and second grooves is located, said annular groove being connected with the air passage formed inside of said rotating shaft.

In a preferred embodiment, a recessed portion is formed on the outer surface of said bearing member with an air filter installed therein, said recessed portion being connected with the boundary portion between said first and second grooves by means of said air passage provided in said bearing member.

In a preferred embodiment, the bearing member is formed in a cylindrical shape with both ends open, said first spiral groove being formed as a symmetric pair on the middle portion of said cylindrical bearing surface, and said second spiral groove being formed as a symmetric pair on both ends thereof.

The fan motor of this invention comprises a rotating shaft to which a fan is secured and a bearing member which has a closed end and which is fitted around the outer circumferential surface of said rotating shaft, wherein a first spiral groove is formed on a portion of one of two cylindrical bearing surfaces facing each other, one being of said rotating shaft and the other of said bearing member, said first spiral groove acting to impel lubrication air between the cylindrical bearing surfaces toward the closed end of said bearing member with the rotation of said rotating shaft, and a second spiral groove is formed on a portion of said cylindrical bearing surface adjacent to the open end of said bearing member, said second spiral groove acting to discharge air toward the open end of said bearing member, an air conducting passage being provided to connect the boundary portion between said first and second grooves with the outside of said bearing unit, and the air passage having an air filter installed at the end thereof opposite from the boundary portion.

In a preferred embodiment, the air passage is formed inside of said rotating shaft.

In a preferred embodiment, the air filter is installed in said bearing member and air is supplied to the boundary portion between said spiral grooves.

In a preferred embodiment, the bearing member is provided with an elastic support which can be swung around a point on the axis.

In a preferred embodiment, the bearing member has both ends closed, one of which is supported by a foil bearing.

In a preferred embodiment, the rotating shaft has an air filter installed in the endmost portion thereof opposite from the end facing the closed end of said bearing member, air being supplied from said endmost portion.

Thus, the invention described herein makes possible the objectives of (1) providing a dynamic pressure air bearing unit that is capable of operating in an environment subjected to floating dust; (2) providing a dynamic pressure air bearing unit in which the pressure of the lubrication air between the rotating shaft and the bearing member rises because of the pumping action of the first spiral groove, thus providing a substantially large load capacity because of a supporting force generated by the wedging action of the lubrication air, while on the other hand air is discharged toward the open end of the bearing member by the pumping action of the second spiral groove, thereby preventing external dust from entering the space between the bearing surfaces and permitting operation in an environment subjected to floating dust; and (3) providing a dynamic pressure air bearing unit in which since atmospheric air cleaned of dust through the filter is supplied to the boundary portion between the first and second grooves, so that no adverse effect is caused to the load capacity of the bearing.

BRIEF DESCRIPTION OF THE DRAWINGS

This invention may be better understood and its numerous objects and advantages will become apparent to those skilled in the art by reference to the accompanying drawings as follows:

FIG. 1b is a front view showing the rotating shaft of the bearing unit shown in FIG. 1a.

DESCRIPTION OF THE PREFERRED EMBODIMENTS

EXAMPLE 1

Figure 1A:
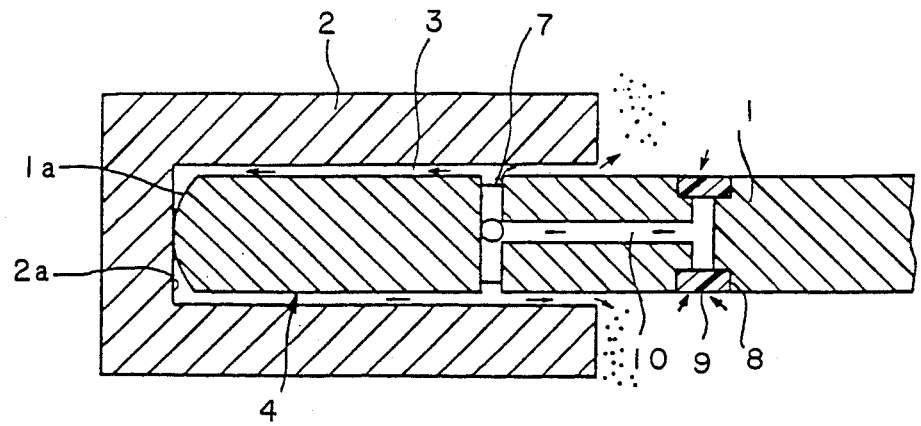
FIG. 1a is a front sectional view showing a dynamic pressure air bearing unit of this invention.
Figure 1B:
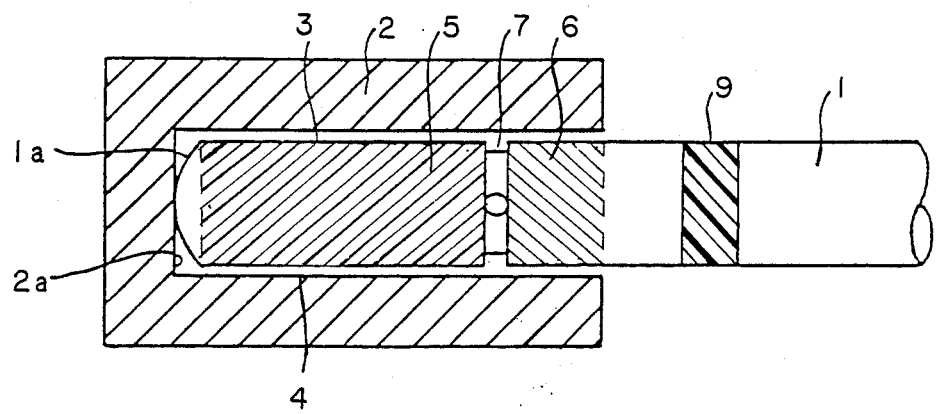

FIG. 1a and 1b show a dynamic pressure air bearing unit of this invention, in which one end portion of a rotating shaft 1 is fitted into a cylindrically shaped bearing member 2 having a closed end. A clearance of a few $\mu$m is provided between the inner circumferential surface of the bearing member 2 and the outer circumferential surface of the rotating shaft 1, where lubrication air 3 which acts as a lubricating fluid is accommodated. On a cylindrical bearing surface 4 on the circumference of the rotating shaft 1 and facing the bearing member 2, there is formed, from a portion appropriately inward of the open end of the bearing member 2 to the innermost portion thereof, a first spiral groove 5 with a plurality of threads for impelling the lubrication air 3 toward an inside bottom 2a of the bearing member 2 with the rotation of the rotating shaft 1. On the other hand, formed on a portion of the outer circumferential surface of the rotating shaft 1 positioned between the open end of the bearing member 2 and the first spiral groove 5 is a second spiral groove 6 for discharging the lubrication air 3 toward the open end. Furthermore, an annular groove 7 for supplying air is formed between the first and second grooves 5 and 6.

Moreover, formed on the rotating shaft 1 and at a position appropriately outward of the open end of the bearing member 2 is a recessed portion 8, in which a filter 9 is installed. The recessed portion 8 and the annular groove 7 are connected by means of an air passage 10 formed within the rotating shaft 1.

One endmost portion of the rotating shaft 1 is so formed as to provide a spherical surface 1a such that its axis point-contacts the inner bottom 2a of the bearing member 2.

Figure 1C:
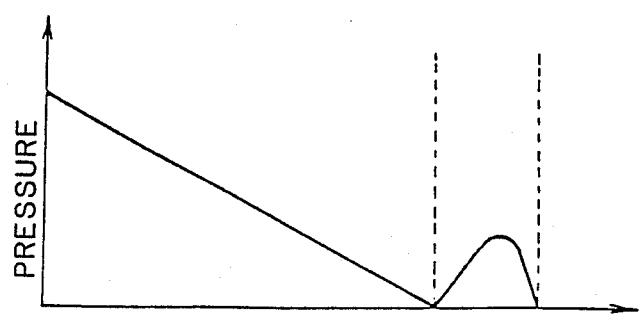
FIG. 1c is of a graph showing the distribution of pressure rising from the position of the annular groove 7 of the rotating shaft 1 toward the inside bottom 2a of the bearing member 2 of the bearing unit shown in FIG. 1a and 1b.

In the above construction, when the rotating shaft 1 is rotated, the lubrication air 3 is impelled toward the inside bottom 2a of the bearing member 2 by the pumping action of the first spiral groove 5, creating a distribution of pressure rising from the position of the annular groove 7 toward the inside bottom 2a as shown in FIG. 1c. Thus, the pressure of the lubrication air 3 rises between the bearing surfaces of the rotating shaft 1 and bearing member 2, thereby providing a substantial bearing load by the wedging action of the lubrication air 3. Also, because of the thrust generated by the pressure of the lubrication air 3 and acting on the endmost portion of the rotating shaft 1, thrust force is also applied to the rotating shaft 1, thus making it possible to support the thrust load. In a stationary rotating condition, axial flow is not generated in the lubrication air 3 over the first spiral groove 5.

On the other hand, near the open end of the bearing member 2, the lubrication air 3 is discharged toward the open end by means of the second spiral groove 6, thereby preventing the dust floating around the bearing member 2 from entering the bearing member 2. This eliminates trouble such as bearing seizure caused by dust and other foreign matter caught inside the bearing, thus allowing trouble-free operation for a long time. Furthermore, clean air passed through the filter 9 is supplied to the annular groove 7 through the air passage 10, and the boundary portion between the first and second spiral grooves 5 and 6 is maintained almost at atmospheric pressure, therefore, the load capacity of the bearing does not decrease.

EXAMPLE 2

Figure 2:
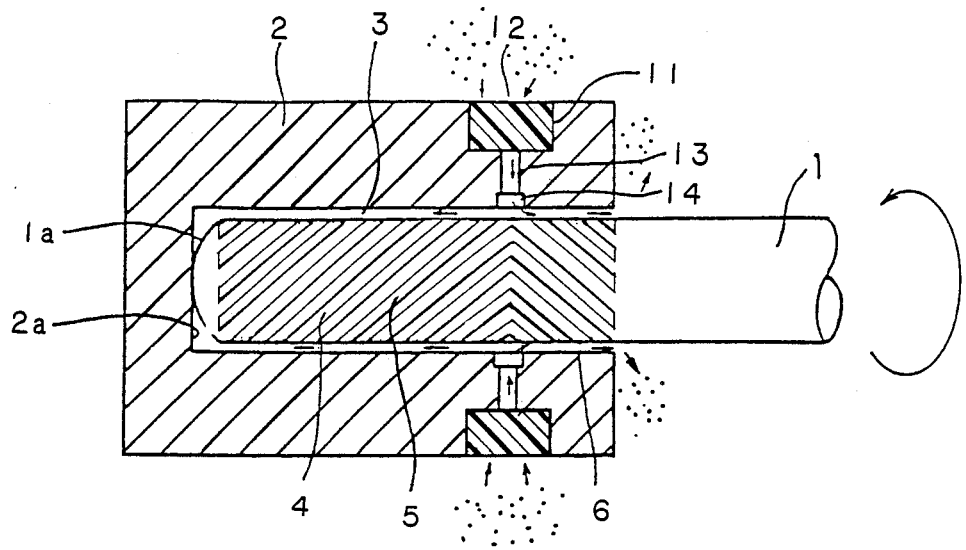
FIG. 2 is a schematic diagram showing another dynamic pressure air bearing unit of this invention.

FIG. 2 shows another dynamic pressure air bearing unit of this invention. The embodiment of FIG. 1 shows an example in which the filter 9 and the air passage 10 for supplying clean air to the portion between the first and second spiral grooves are provided in the rotating shaft 1, but alternatively, as in the second embodiment shown in FIG. 2, a recessed portion 11 can be formed on the outer surface of the bearing member 2, a filter 12 being installed therein, with an annular groove 14 for supplying air formed on the inner circumferential surface of the bearing member 2 at the position facing the boundary portion between the first and second spiral grooves 5 and 6. The recessed portion 11 and the annular groove 14 are connected by an air passage 13.

EXAMPLE 3

Figure 3:
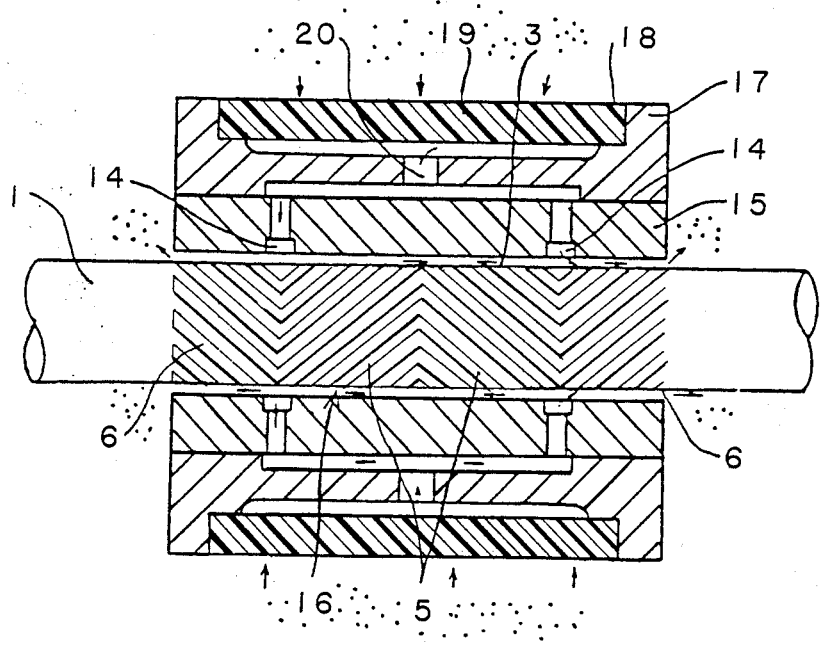
FIG. 3 is a schematic diagram showing another dynamic pressure air bearing unit of this invention.

The above embodiments show examples in which the bearing member 2 is formed in a cylindrical shape with a closed end, and is capable of supporting thrust load as well, but as in the third embodiment shown in FIG. 3, the invention can be also applied to a radial bearing, in which the rotating shaft 1 is inserted through a cylindrical bearing member 15, and on a cylindrical bearing surface 16 of the rotating shaft 1 that faces the bearing member 15, a pair of first spiral grooves 5 are formed symmetrically on the middle portion, and a pair of second spiral grooves 6 symmetrically on both ends. A pair of annular grooves 14 are formed on the portions of the inner circumferential surface of the bearing member 15 which respectively face the boundary portions between the first and second grooves 5 and 6. Fitted integrally onto the outer circumferential surface of the bearing member 15 is an outer sleeve 17, on the outer circumferential surface of which a recessed portion 18 is formed with a filter 19 installed therein, the recessed portion 18 and the pair of annular grooves 14 being connected by an air passage 20.

In this embodiment, the lubrication air pressure becomes high in the middle portion of the bearing to provide a supporting force for the shaft. Otherwise, it provides the same functions as the first embodiment.

EXAMPLE 4

Figure 4:
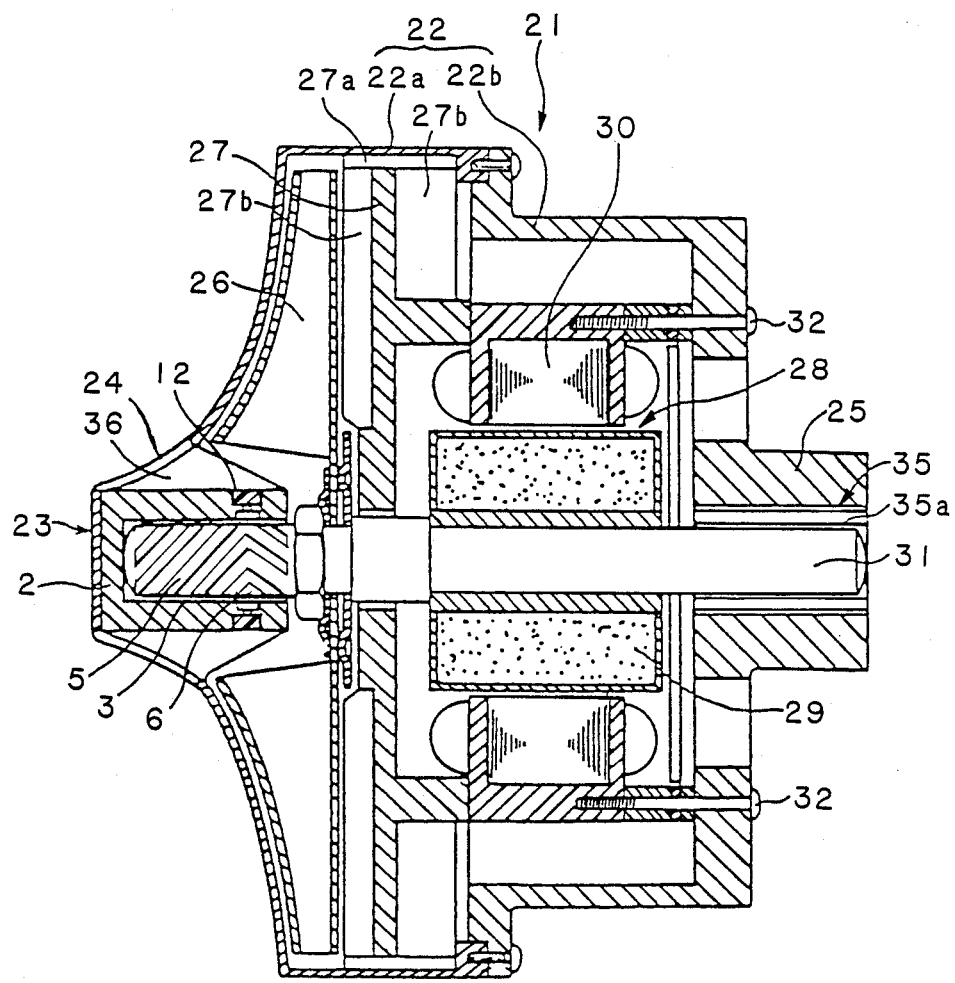
FIG. 4 is a schematic diagram showing the application of the bearing unit of FIG. 2 to a fan motor for a vacuum cleaner.

FIG. 4 shows an application of the bearing unit of the present invention of FIG. 2 to a fan motor for a vacuum cleaner.

The reference numeral 21 indicates a fan motor mounted in a vacuum cleaner not shown. A dust collecting filter (not shown) is disposed in front of an air inlet 36 at the foremost end of the motor, and connects with an intake port (not shown) through an intake hose (not shown).

A casing 22 is divided into a front casing 22a and a rear casing 22b. Disposed on the axis at the foremost end of the front casing 22a is a dynamic pressure air bearing 23 of the same construction as employed in the second embodiment shown in FIG. 2, the dynamic pressure air bearing 23 being provided with an elastic support which can be swung around a point on the axis by elastic members 24 radially extending from the bearing member 2. The space between the elastic members 24 forms on the air inlet 36. A bearing housing 25 is disposed on the axis at the rearmost end of the rear casing 22b.

A fan 26 and a diffuser 27 are disposed inside the front casing 22a, while a brushless motor 28 is mounted inside the rear casing 22b.

The brushless motor 28 comprises a rotor 29, and a stator 30 disposed around the outer circumference thereof with a suitable clearance, the rotor 29 being fixed permanently to the rear portion of a rotating shaft 31, and the stator 30 being fixed to the rear casing 22b with a fixing bolt 32.

The fan 26 is secured to the front portion of the rotating shaft 31, and the diffuser 27 is positioned behind the fan 26 and attached to the front casing 22a. Between the outer circumferential surface of the diffuser 27 and the inner circumferential surface of the front casing 22a is formed a restricted passage where numerous guide fins 27a are disposed. The reference numeral 27b indicates the rib formed on the diffuser 27.

The other end of the rotating shaft 31 is fitted into a foil bearing 35 formed on the inner circumferential surface of the bearing housing 25. The foil bearing 35 comprises a bearing surface 35a formed of thin film-like foil with good deformability such as metal foil, plastic film, etc., and a buffer area formed by the foil of a corrugated shape and disposed between the bearing surface and the inner circumferential surface of the bearing housing 25.

The following describes the operation of the fan motor.

When the stator 30 of the brushless motor 28 is energized, the rotor 29 and, thus, the rotating shaft 31 start to rotate, and when the rotating speed increases, the lubrication air 3 in the dynamic pressure air bearing 23 is impelled toward the inside bottom of the bearing member 2 by the pumping action of the first spiral groove 5, increasing the air pressure and generating a radially supporting force by the wedging action of the lubrication air between the inner circumferential surface of the bearing member 2 and the outer circumferential surface of the rotating shaft 31, thus supporting a substantially large radial load caused by an unbalanced load of the rotor 29, etc. On the other hand, rearward thrust acts on the rotating shaft 31 because of the pressure acting on the endmost portion of the rotating shaft 31, the rearward thrust providing a supporting force for the forward thrust (fan thrust) acting on the rotating shaft 31 with the rotation of the fan 26.

Also, the rear end portion of the rotating shaft 31, which is spaced away from the fan 26 and therefore to which no large radial load is applied, is supported by the foil bearing 35. The foil bearing 35 provides a stable support for the rotating shaft 31 which rotates at high speed, and absorbs any axial eccentricity with respect to the dynamic pressure air bearing 23. Furthermore, since the bearing member 2 is provided with an elastic support in a swingable way by the elastic members 24, the bearing member 2 readily follows any inclination of the rotating shaft 31. Thus, the rotating shaft 31 is provided with a stable support for rotation even if its axis accuracy is not good.

Since both ends of the rotating shaft 31 are supported by the dynamic pressure air bearing 23 and the foil bearing 35 in a non-contacting and aligning manner as described above, the motor can be run at such high speeds as 50,000 to 60,000 r.p.m. without substantial noise or vibration, thus resulting in an extended service life as well as a smaller torque loss.

The air taken in through the air intake 36 by the rotation of the fan 26 is impelled by the centrifugal force generated by the fan 26 toward the circumference thereof, and then is passed, being directed by the guide fins 27a, through the restricted passage on the outer circumference of the diffuser 27 before being diffused therebehind and discharged from the back of the rear casing 22b through the space around the outer circumference of the stator 30.

EXAMPLE 5

Figure 5:
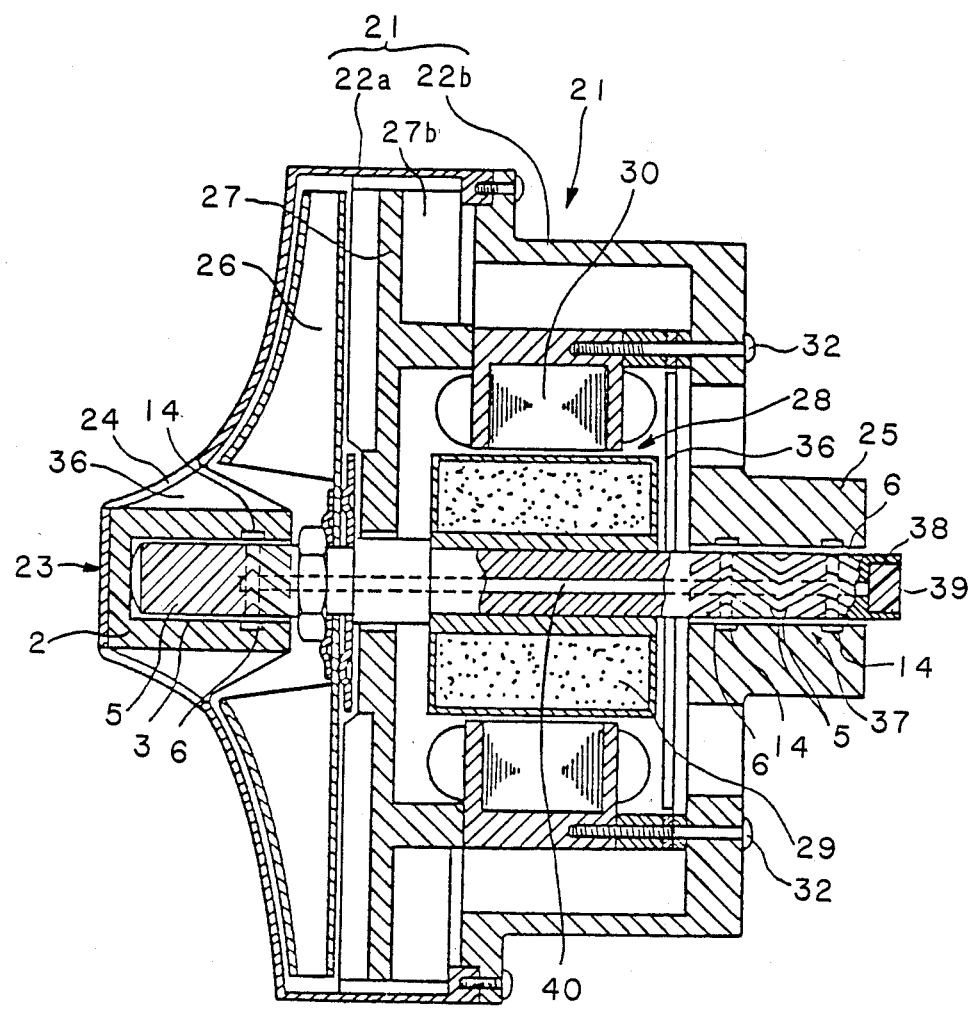
FIG. 5 is a schematic diagram showing the application of a bearing unit of this invention to a fan motor for a vacuum cleaner.
Figure 6:
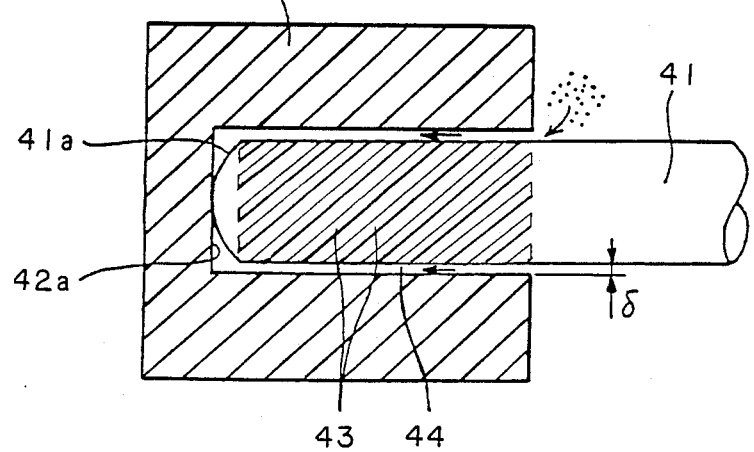
FIG. 6 is a schematic diagram showing a conventional dynamic pressure air bearing unit.

In the embodiment shown in FIG. 4, the dynamic pressure air bearing 23 is disposed at the front end, and the foil bearing 35 at the rear end, the air supplied to the dynamic pressure air bearing 23 being taken in through the air intake 36, but alternatively, as in the fifth embodiment shown in FIG. 5, the bearing unit of this invention can be so constructed that the air is taken in from the rear end portion of the rotating shaft 31 where fewer quantities of floating dust are present.

In FIG. 5, a recessed portion 38 is formed on the rearmost portion of the rotating shaft 31, and the recessed portion 38 and the annular groove 14 on the inner circumferential surface of the bearing member 2 are connected with each other via an air passage 40 passing through the axis of the rotating shaft 31. In this embodiment also, the rear end portion of the rotating shaft 31 is supported by the same air bearing 37 as in the third embodiment shown in FIG. 3. The pair of annular grooves 14 formed on the inner circumferential surface of the bearing housing 25 and facing the boundary portions between the first and second grooves 5 and 6 are connected with the air passage 40 provided in the rotating shaft 31. This embodiment provides the same functions as the fourth embodiment.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A dynamic pressure air bearing unit comprising a rotating shaft and a bearing member fitted around the outer circumferential surface of said rotating shaft, wherein a first spiral groove is disposed on a part of one of two cylindrical bearing surfaces facing each other, one being of said rotating shaft and the other of said bearing member, said first spiral groove acting to impel lubrication air between the cylindrical bearing surfaces toward the innermost portion of said bearing member with the rotation of said rotating shaft, and a second spiral groove is disposed on a portion of said cylindrical bearing surface adjacent to the open end of said bearing member, said second spiral groove acting to discharge air toward said open end of said bearing member, an air conducting passage being provided to connect the boundary portion between said first and second grooves with the outside of said bearing unit, and the air passage having a filter installed at the open end thereof.

2. A dynamic pressure air bearing unit as set forth in claim 1, wherein said bearing member has a closed end.

3. A dynamic pressure air bearing unit as set forth in claim 2, wherein the end of said rotating shaft fitted into said bearing member is formed in a spherical shape so as to point-contact the inside bottom of said bearing member.

4. A dynamic pressure air bearing unit as set forth in claim 1, wherein said air passage is formed inside of said rotating shaft.

5. A dynamic pressure air bearing unit as set forth in claim 4, wherein an annular groove for supplying air is formed on the portion of said rotating shaft where the boundary portion between said first and second grooves is located, said annular groove being connected with the air passage formed inside of said the rotating shaft.

6. A dynamic pressure air bearing unit as set forth in claim 1, wherein a recessed portion is formed on the circumferential surface of said rotating shaft, said recessed portion having an air filter installed therein.

7. A dynamic pressure air bearing unit as set forth in claim 1, wherein a recessed portion is formed on the outer surface of said bearing member with an air filter installed therein, said recessed portion being connected with the boundary portion between said first and second grooves by means of said air passage provided in said bearing member.

8. A dynamic pressure air bearing unit as set forth in claim 1, wherein said bearing member is formed in a cylindrical shape with both ends open, said first spiral groove being formed as a symmetric pair on the middle portion of said cylindrical bearing surface, and said second spiral groove being formed as a symmetric pair on both ends thereof.

9. A fan motor comprising a rotating shaft to which a fan is secured and a bearing member which has a closed end and which is fitted around the outer circumferential surface of said rotating shaft, wherein a first spiral groove is formed on a portion of one of two cylindrical bearing surfaces facing each other, one being of said rotating shaft and the other of said bearing member, said first spiral groove acting to impel lubrication air between the cylindrical bearing surfaces toward the closed end of said bearing member with the rotation of said rotating shaft, and a second spiral groove is formed on a portion of said cylindrical bearing surface adjacent to the open end of said bearing member, said second spiral groove acting to discharge air toward the open end of said bearing member, an air conducting passage being provided to connect the boundary portion between said first and second grooves with the outside of said bearing unit, and the air passage having an air filter installed at the end thereof opposite from the boundary portion.

10. A fan motor as set forth in claim 9, wherein said air passage is formed inside of said rotating shaft.

11. A fan motor as set forth in claim 9, wherein said air filter is installed in said bearing member and air is supplied to the boundary portion between said spiral grooves.

12. A fan motor as set forth in claim 9, wherein said bearing member is provided with an elastic support which can be swung around a point on the axis.

13. A fan motor as set forth in claim 9, wherein said bearing member has both ends closed, one of which is supported by a foil bearing.

14. A fan motor as set forth in claim 9, wherein said rotating shaft has an air filter installed in the endmost portion thereof opposite from the end facing the closed end of said bearing member, air being supplied from said endmost portion.

* * * * *